United States Patent [19]
Desnoyers et al.

[11] 3,726,644
[45] Apr. 10, 1973

[54] FLOW CALORIMETER

[75] Inventors: Jacques E. Desnoyers; Carmel Jolicoeur; Patrick Picker, all of Sherbrooke, Quebec, Canada

[73] Assignee: University of Sherbrooke, Sherbrooke, Province of Quebec, Canada

[22] Filed: Feb. 24, 1970

[21] Appl. No.: 13,433

[52] U.S. Cl................23/230 R, 23/253 R, 73/190 R
[51] Int. Cl....G01k 17/02, G01k 17/04, G01n 33/00
[58] Field of Search........................23/253, 259, 230; 73/190, 204

[56] References Cited

UNITED STATES PATENTS 3,505,024  4/1970  Ishimaru et al..........................23/253
3,453,880  7/1969  Dropkin et al. .........................73/190

OTHER PUBLICATIONS

Picker et al., "Differential Flow Calorimeter", presented at 23rd Calorimetry Conference, Midland, Michigan (Aug. 15, 1968).

*Primary Examiner*—Joseph Scovronek
*Attorney*—Raymond A. Robic

[57] ABSTRACT

The invention relates to a flow microcalorimeter wherein the reactant fluids are injected in one tubular flow chamber and reacted while mixing and flowing therethrough and a heat exchange means is associated with the tubular flow chamber wherethrough a fluid is circulated in a reverse flow direction. Measurements can be made in either the adiabatic or the isothermal mode depending on the relative flow of the reactant fluids and the heat exchange fluids. In some applications, such as when very fine measurements are required, thermal effects unrelated to the mixing can be cancelled out by introducing the already mixed and reacted fluids into a similar tubular flow chamber with a similar heat exchanger, this arrangement including a differentially coupled temperature sensing means associated with the outlets of said heat exchange means.

12 Claims, 2 Drawing Figures

INVENTORS
Jacques E. DESNOYERS
Carmel JOLICOEUR
Patrick PICKER

ATTORNEY

FLOW CALORIMETER

The present invention relates to an improved form of flow calorimeters, and particularly one in which the heat of reaction is transferred to a heat exchange fluid for measurement thereof.

To date, most of the research involving calorimetric measurements has been carried out by means of the conventionally known closed cell-type of calorimeters. Flow calorimeters have been known and used for some time and their advantages over other types of calorimeters when dealing with fluid systems wherein chemical equilibrium is rapidly reached, are obvious. Some highly sensitive forms of flow calorimeters have been developed and are generally referred to as flow microcalorimeters; such instruments have been described in the technical literature by Monk P. and Wadso I. in Acta. Chem. Scand. 1968, 22, 1842, and by Stoesser P.R. and Gill S.J. in Rev. Sci. Instrum. 1967, 38, 422. The instrument of the present invention falls in the category of flow microcalorimeters; however, it differs markedly from the instruments developed and described by the aforementioned authors in its principles and characteristics, especially with regard to their response time.

A significant object of the invention is therefore to provide an instrument wherein the time required to reach a steady state is considerably reduced and may be of the order of one minute; one advantage of the improvement in response time is that it makes it possible, through an instrument of the present invention, to derive from a single experiment all the data necessary to plot a curve of enthalpy of mixing fluid reactants as a function of their volumetric ratios, by continuously varying the ratio of their respective rates of flow. Such an experiment lasting approximately one hour. This hitherto unachieved possibility of effecting a continuous scanning while simultaneously varying one of the experimental conditions such as the composition of the reactant fluids or their volumetric flow ratio, has appreciably broadened the field of useful and practical applications for flow microcalorimeters of the present invention.

The flow microcalorimeter of the invention is particularly intended for use in the isothermal mode of operation and can also be used for effecting thermal sensing, for operation according to the adiabatic operational mode.

A further advantage of the instrument of the present invention is that it can be used for operation on systems of electrolytic solutions as well as on non-electrolytic systems.

A better understanding of the invention will be derived from the following disclosure of preferred embodiments thereof, reference being made throughout to the drawing forming a part thereof, wherein:

FIG. 1 is used for the purpose of outlining the general principle underlying the construction of flow calorimeters in accordance with the invention and shows, by way of example, a differential flow calorimeter.

Figure 1:
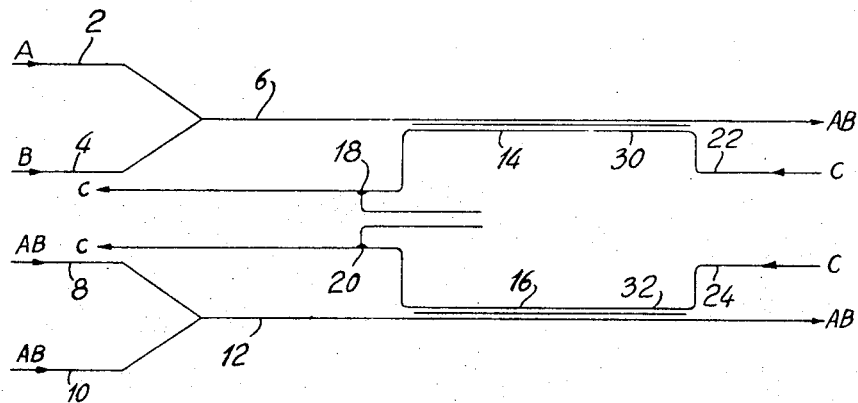
FIG. 1 is a schematic illustration of a flow calorimeter embodying the underlying principle of the present invention.

The general principle of the flow calorimeters is illustrated in FIG. 1. The reactant fluids A & B are thermostated prior to their mixing and react upon being injected from their respective feed tubes 2 and 4 into a flow cell 6. In passing through flow cell 6 the fluids A and B become thoroughly mixed and as the mixing progresses from left to right so does the reaction between them. Temperature changes which occur during the mixing can be followed and it is precisely in the choice of a method for following these temperature changes that lies the main difference between an adiabatic and an isothermal instrument.

At constant flow rate of reactants A and B, the system will reach a steady state after a period of time, known as the time constant. Now, in accordance with one embodiment of the invention, if the mixture AB which results from the thorough mixing of reactants A and B is circulated through a duplicate system, consisting of feed tubes 8 and 10 and mixing cell 12 and care is taken to effect thermostating of the mixture previously, it becomes possible to derive from such a second system the temperature data necessary to differentially cancel out from the temperature data obtained in the first system the portion thereof which is attributable to thermal effects unrelated to the mixing reaction between A and B.

The isothermal condition is achieved when the heat evolved or absorbed in each of the flow cells 6 and 12 is transferred to heat sinks 14 and 16 respectively and the magnitude of the heat flux is evaluated by temperature sensing devices 18 and 20 respectively placed across the heat transfer path. From such heat flux measurements a calculation of the enthalpy of mixing requires only a further knowledge of the absolute rate of flow of each fluid.

Figure 2:
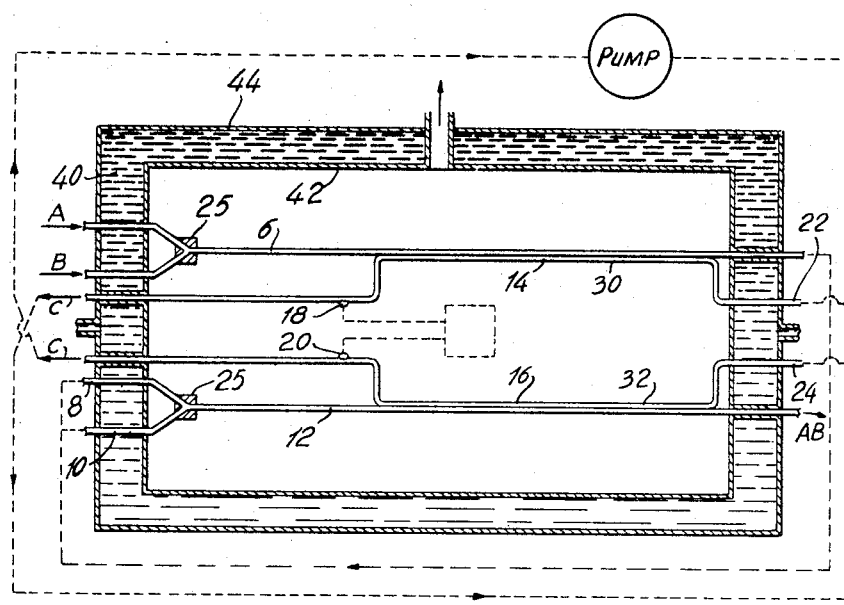
FIG. 2 is a more detailed schematic view of an isothermal differential flow calorimeter according to the present invention.

In the embodiment as shown in FIGS. 1 and 2, the heat sinks 14 and 16 consist of tubes 22 and 24 respectively through each of which is circulated a heat exchange liquid C; the rates of flow of the heat exchange fluid C in tubes 22 and 24 respectively being made equal by connecting them in series through a closed-loop system; the fluid C flowing through the tubes 22 and 24 is also thermostated prior to entering the instrument. Portions 30 and 32 respectively of tubes 22 and 24 are disposed alongside corresponding flow cells 6 and 12 respectively and in heat exchange relationship therewith; the flow of the heat exchange liquid C in each of tubes 22 and 24 being in a direction opposite to the direction of flow of mixture AB through corresponding flow cells 6 and 12 respectively.

In isothermal calorimeters the heat from the cell is usually transferred to the heat sink by thermal conduction, e.g. through thermopiles. However, the intrinsic thermal conductivity and heat capacity of thermopiles considerably lengthen the equilibrium time and are not well suited for flow calorimeters. In this respect, the chosen heat transfer mode cannot be regarded as a conventional heat sink; its dynamic nature gives it characteristics unattainable by the heat transfer modes used in other flow calorimeters. The system essentially transfers very effectively the heat of a fluid of unknown or varying heat capacity to one of fixed heat capacity. The problem is then reduced to that of measuring the change in temperature of the second fluid which is easily obtained with any fast-response sensitive temperature detectors (18 and 20) such as thermistors or thermocouples. In the present case, thermistors are the chosen form of detection.

For achieving total heat transfer (isothermal mode), the flow rate of the exchanger liquid C through each of tubes 22 and 24 must be slightly greater than that prevailing in each of the corresponding flow cells 6 and 12, when both liquids AB and C have identical heat capacities. In such a case, the difference in temperature detected at sensors 18 and 20 is directly proportional to the heat flux from the reaction in cell 6. At a given flow rate of the reactants A and B, the optimum working length for each of the heat exchanger portions 30 and 32 will increase as the flow rate of C in each of the exchanger tubes is increased and vice-versa to a limited extent. If the flow rate of C in the exchanger tubes was reduced to a value below that of the flow rate of the reactants A and B in the flow cells 6 and 12 (assuming that all liquids have the same specific heat characteristics) complete heat transfer would no longer be possible; the temperature of the liquid C at the outlet of the heat exchanger would simply come to thermal equilibrium with the mixing cell, and the measurement yields the temperature of mixing (which is independent of the flow rate) of the reacting system. In such a case, the instrument is operating in adiabatic conditions.

The sensitivity of the isothermal flow microcalorimeter drops as the flow rate of the exchanger liquid increases; thus if the Instrument is to be used efficiently in the isothermal mode, the rate of flow of the exchanger liquid C would have to be made high enough to ensure that complete heat transfer conditions will be preserved at all times but also low enough to retain the desired degree of sensitivity.

As compared to adiabatic conditions wherein the sensing of temperatures would normally be carried directly on the flow cells, one would expect that because the relatively larger heat capacity contributed by its heat exchanger systems, the isothermal instrument of the invention would have a less favorable time constant; it has been determined, however, that the intrinsic efficiency of the counter current heat transfer is high enough to almost completely compensate for the reverse effect that its added heat capacity may have on the value of the time constant.

An isothermal flow microcalorimeter was constructed as schematically outlined in FIG. 2 wherein the feed tubes 2, 4, 8 and 10 as well as the heat exchanger tubes 22 and 24 were made of stainless steel tubing of 0.1 cm. O.D. and 0.074 cm. I.D.

In order to thermostat the fluids A, B and AB the feed tubes were set directly across the path of the water in a constant temperature bath 40. Injection blocks 25 machined in tetrafluorethylene resin were used for each of the junctions between the feed tubes and their respective flow cells. They could equally well be made of two concentric stainless steel capillary tubing. The flow cells were also made of thin walled small diameter stainless steel tubing and are approximately 50 cm in length. From a point approximately 15 cm from the injection block each flow cell has, silver welded thereon, one of the heat exchanger tubes 30 and 32. The calorimeter is set in a vacuum housing 42 surrounded by a thermostating jacket 44 in which the water of the constant temperature bath 40 is circulated. The thermal detection is made on the outlet portion of each heat exchanger; the sensors 18 and 20 being thermistors of 300 k $\Omega$ at 25° C which are differentially connected in a low voltage D.C. powered wheatstone bridge arrangement.

To further reduce the time constant of the apparatus and particularly to increase the rapidity of the mixing and reaction and efficiency of the heat exchange, it was found useful to provide inside the flow chambers some means whereby to induce turbulence in the flow or disrupt laminar flow therein; it was found satisfactory for this purpose to indent the stainless steel tube beyond the mixing chamber at regular close interval, making each dent at right angles with the previous one.

It should be understood that in the actual construction of a microcalorimeter according to the present invention, the normal heat shielding and insulation means are provided in the same manner as in other instruments of the same kind, these are precautions which are obvious to one skilled in the art and they do not form part of the invention proper, it was found preferable to omit specific reference to them in the present disclosure.

We claim:

1. A flow calorimeter comprising the combination of: a first tube for the circulation of a fluid mixture under observation, said first tube having an inlet end and a discharge end; a second tube for the circulation of a heat-exchange liquid; a pair of feed tubes in fluid communication with said inlet end of said first tube for delivering thereto fluids to be mixed; said first and second tubes having co-extensive heat-exchange sections made of thermal conductive material and juxtaposed to one another in a close heat-exchange relationship with each other, the heat-exchange section of said second tube having an inlet end and an outlet end; said first tube also having a mixing region intermediate of and connected in fluid communication with both said inlet end and said heat-exchange section of the first tube, said mixing region being of sufficient length to enable substantial mixing of fluids emanating from said feed tubes before reaching said heat-exchange section of said first tube; first pumping means for circulating said fluids at predetermined flow rates through said feed tubes thereby causing said fluids to mix in said mixing region and then causing said fluid mixture to flow through said heat-exchange section of said first tube to said discharge end thereof; second pumping means for circulating said heat-exchange liquid at a controlled flow rate through said heat-exchange section of said second tube in a direction opposite to that of said fluid mixture in the heat-exchange section of said first tube; means for controlling the temperatures of said fluids in said feed tubes and of said heat-exchange liquid in said second tube adjacent the inlet end of the heat-exchange section thereof; and temperature sensing means for measuring the temperature of said heat-exchange liquid adjacent the outlet end of the heat-exchange section of said second tube.

2. A flow calorimeter as defined in claim 1, wherein the heat-exchange sections of said first and second tubes and the mixing region of said first tube are disposed within an evacuated chamber for thermal insulation.

3. A flow calorimeter as defined in claim 1 including a third tube which has an inlet end and a discharge end, the inlet end of said third tube being serially connected with the discharge end of said first tube to receive said fluid mixture therefrom, a fourth tube with a circulation of a heat-exchange liquid identical to that in the second tube; said third and fourth tubes having dimensions the same as said first and second tubes, respectively, and having co-extensive heat-exchange sections made of thermal conductive material and juxtaposed to one another in a close heat-exchange relationship with each other; said second pump means also including means for circulating said heat-exchange liquid through the fourth tube in a direction opposite to the direction of flow of liquid in the third tube, means for controlling the temperatures of said fluids in the third and fourth tubes, and temperature sensing means for measuring the temperature of said heat-exchange liquid adjacent the outlet end of the heat-exchange section of the fourth tube.

4. A flow calorimeter as defined in claim 3, including means for mounting all of said first, second, third and fourth tubes in the same temperature heat insulated environment.

5. A flow calorimeter as defined in claim 3, including means for comparing the temperature sensed by the two said temperature sensing means.

6. A differential flow calorimeter comprising first and second essentially identical fluid flow systems disposed within a heat insulated chamber, each one of said fluid flow systems including a first tube for circulating a fluid mixture, a second tube for circulating a heat-exchange fluid, and a heat exchanger formed by juxtaposed sections of said first and second tubes, the first tube of each system including a pair of feed tubes, such that two different liquids can be introduced into the first tube of the first system and mixed within the first tube of the first of said fluid flow systems upstream from the heat exchanger thereof, means for controllably circulating said fluid mixture successively through the first tube of the first fluid flow system and the first tube of the second fluid flow system, means for controllably circulating said heat exchange liquid through said second tubes in such a manner that in each of one of said heat exchangers said fluid mixture and said heat-exchange liquid flow in opposite directions, means for controlling temperatures at the inlet ends of said first and second tubes, and temperature sensing means for comparing the temperature of said heat-exchange liquid adjacent the outlet ends of said heat exchangers.

7. A differential flow calorimeter according to claim 6, wherein said heat insulated chamber is a vacuum chamber.

8. A differential flow calorimeter as defined in claim 6, wherein said temperature sensing means comprises a thermistor disposed in thermal contact with said heat-exchange liquid adjacent the outlet end of each heat exchanger, said thermistors being connected across a wheatstone bridge circuit.

9. A differential flow calorimeter as defined in claim 7, wherein each one of said first and second tubes comprises a length of thin walled small diameter stainless steel tubing; and wherein said said lengths are silver soldered to one another in the vicinity of the heat exchanger juxtaposed sections thereof.

10. A differential flow calorimeter as defined in claim 9, wherein said means for controlling temperatures comprises a constant temperature liquid bath and a thermostating jacket through which said liquid is caused to circulate.

11. A method for obtaining calorimetry data of a mixture of two fluids, comprising the steps of controlling the temperature of the two fluids and injecting said fluids in a first flow mixing tube and passing the mixture of said fluids through the first tube of a first counterflow heat exchanger such that mixing of the two fluids is upstream from the heat exchanger, controlling the temperature of a heat exchange liquid and passing said heat-exchange liquid through the second tube of said mixture, said second tube of the heat exchanger being co-extensive and in close heat exchange relationship with the first tube of the heat exchanger, controlling the relative flow rates in the two tubes of the heat exchanger to determine the mode of heat exchange therein, and measuring any temperature variation of said heat exchange liquid adjacent the outlet end of the second tube of the heat-exchanger.

12. A method as claimed in claim 11, comprising the additional steps of passing said fluid mixture through a duplicate mixing tube and a duplicate first tube of a duplicate counterflow heat-exchanger, passing said heat exchange liquid through a duplicate second tube of said duplicate counterflow heat exchanger, thermostating said two fluids upstream from said first mixing tube, thermostating said fluid mixture upstream from said duplicate mixing tube, thermostating said heat exchange liquid upstream from said second tubes of said first and duplicate heat exchangers, and comparing the temperature of said heat exchange liquids immediately downstream from said second tubes of said first and duplicate heat-exchangers.

* * * * *

UNITED STATES PATENT OFFICE
CERTIFICATE OF CORRECTION

Patent No. 3,726,644　　　　　　　　Dated April 10, 1973

Inventor(s) Patrick Picker; Carmel Jolicoeur; Jacques E. Desnoyers

It is certified that error appears in the above-identified patent and that said Letters Patent are hereby corrected as shown below:

In the upper left-hand corner of the first page, please change "Desnoyers et al" to --Picker et al--.

In the heading, please change the order of the inventors' names to read as follows:

Patrick Picker
　　Carmel Jolicoeur
　　Jacques E. Desnoyers

Signed and sealed this 4th day of March 1975.

(SEAL)
Attest:

RUTH C. MASON
Attesting Officer

C. MARSHALL DANN
Commissioner of Patents
and Trademarks